United States Patent
Pfeffer et al.

[11] Patent Number: 5,941,624
[45] Date of Patent: Aug. 24, 1999

[54] REFRIGERATOR DOOR ASSEMBLY AND METHOD

[75] Inventors: Michael Allen Pfeffer; John Randall Reeves, both of Louisville, Ky.

[73] Assignee: General Electric Company, Louisville, Ky.

[21] Appl. No.: 08/881,634

[22] Filed: Jun. 24, 1997

Related U.S. Application Data

[63] Continuation of application No. 08/586,210, Jan. 16, 1996, abandoned.

[51] Int. Cl.⁶ .................................................. A47B 96/04
[52] U.S. Cl. ...................... 312/405.1; 312/406; 52/309.9
[58] Field of Search ................................. 312/405.1, 406, 312/405, 400, 401; 52/742.11, 792.1, 794.1, 784.12, 784.13, 784.15, 406.3, 309.9, 309.14; 49/501

[56] References Cited

U.S. PATENT DOCUMENTS

| | | | |
|---|---|---|---|
| 2,728,623 | 12/1955 | Foerstner | 312/405.1 X |
| 2,837,816 | 6/1958 | Saunders | 312/405.1 X |
| 2,903,315 | 9/1959 | Schory et al. | 312/405.1 |
| 2,976,098 | 3/1961 | Combs | 312/405.1 |
| 4,199,205 | 4/1980 | Cooke et al. | |
| 4,370,374 | 1/1983 | Raabe et al. | |
| 4,435,934 | 3/1984 | Kim | 52/309.9 X |
| 4,583,796 | 4/1986 | Nakajima et al. | |
| 4,858,403 | 8/1989 | Lingle | 52/309.9 X |
| 4,974,914 | 12/1990 | Jenkins | |
| 5,082,335 | 1/1992 | Cur et al. | 52/406.3 X |
| 5,322,366 | 6/1994 | Revlett et al. | 312/405.1 |
| 5,374,924 | 12/1994 | Pohl et al. | 312/405.1 |
| 5,418,028 | 5/1995 | DeWitt | 52/309.9 X |
| 5,435,108 | 7/1995 | Overbolt et al. | 52/309.9 X |

FOREIGN PATENT DOCUMENTS 1105892  5/1961  Germany .............................. 312/405.1

Primary Examiner—Peter M. Cuomo
Assistant Examiner—Hanh V. Tran
Attorney, Agent, or Firm—H. Neil Houser

[57] ABSTRACT

A refrigerator door assembly has an outer door member with a rectangular front panel surrounded by a rearward projecting peripheral rim around its perimeter to form a cavity. A body of insulation foamed-in-place in the cavity includes a rib of predetermined external cross-section that projects rearward along the rim. An inner door member includes a rectangular base panel with a hollow peripheral wall structure projecting rearward around its perimeter. The wall structure has an internal cross-section complimentary to the external cross-section of the rib. When the inner door member is mounted on the outer door member the rib is received within the wall structure.

2 Claims, 1 Drawing Sheet

REFRIGERATOR DOOR ASSEMBLY AND METHOD

This application is a continuation, of application Ser. No. 08/586,210, filed Jan. 16, 1996, now abandoned.

BACKGROUND OF THE INVENTION

Many current refrigerator doors have foamed-in-place insulation. That is a body of insulation, normally a polyurethane, is foamed in the cavity formed by outer door member. An inner door member is mounted to the outer member and covers the insulation. Often the inner member fits within the cavity of the outer door and provides a recess for storing items in the door. In any event the inner door member normally includes a hollow wall structure that projects rearward from the outer door member and is received in the refrigerated compartment. This hollow wall structure provides a vehicle which allows heat to seep past the door gasket to the interior of the compartment. One way to alleviate this problem is by manually filling the hollow wall structure of the inner door member with insulation, such as fiber glass for example. This is a time consuming and messy operation. The heat leakage problem can be solved by foaming-in-place the inner door member. That is by attaching the inner and outer door members and then foaming the insulation to fill in the space defined by the door members. However, such a process is very difficult and involves very high tooling costs for a high volume production environment.

SUMMARY OF THE INVENTION

It is an object of the present invention to provide an improved refrigerator door assembly.

It is another object of the present invention to provide such an improved assembly which significantly reduces heat leakage around the perimeter of the door.

It is still another object of the present invention to provide such an improved door assembly in which the foamed-in-place insulation in the outer door member cavity includes a rib that substantially fills the hollow wall structure around the perimeter of the inner door member.

In accordance with an exemplary embodiment of the present invention a refrigerator door assembly includes an outer door member having a generally rectangular front panel with a rim projecting generally perpendicularly rearward around its periphery and forming a cavity. An inner door member has a generally rectangular base panel with an inner wall projecting generally perpendicularly rearward around its periphery. An outer wall is joined to the inner wall and projects generally perpendicularly forward in spaced relationship to the inner wall. The inner door member is mounted on the outer door member with the rim and the outer wall juxtaposed and with the base panel spaced from the front panel. A body of insulation foamed-in-place in the outer door cavity substantially fills the space between the inner and outer door members and includes a rib that substantially fills the space between the inner and outer walls of the inner door member.

BRIEF DESCRIPTION OF THE DRAWINGS

The subject matter regarded as the invention is particularly pointed out and distinctly claimed in the concluding portion of the specification. The invention, however, both as to organization and method of operation, together with further objects and advantages thereof, may be better understood by reference to the following detailed description when read with the accompanying drawings in which:

DETAILED DESCRIPTION OF PREFERRED EMBODIMENT

Figure 1:
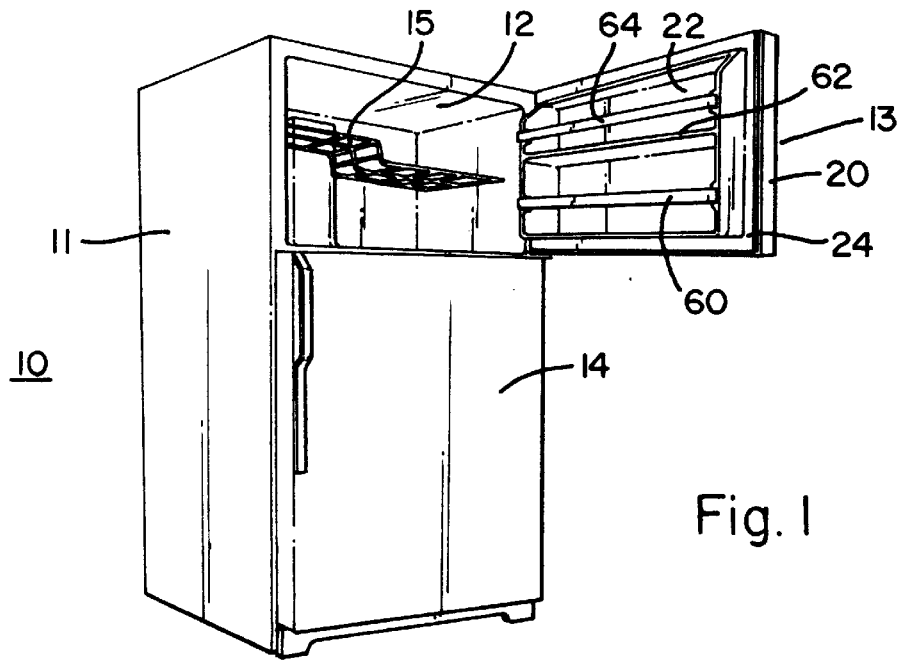
FIG. 1 is a front perspective view of a top mount refrigerator with the freezer door open.

Referring particularly to FIG. 1, there is illustrated a household refrigerator 10 of the top mount type in which the cabinet 11 includes a freezer storage compartment 12 mounted above a fresh food storage compartment. Each of the compartments has a front access opening which is normally closed by freezer door 13 and fresh food door 14 respectively. While the illustrative embodiment of the invention will be described in detail hereafter in regard to freezer door 13, it will be understood that the invention also is applicable to fresh food doors, such as that shown at 14. It also will be understood that refrigerator 10 is shown for illustrative purposes only and that the present invention also is applicable to doors for side-by-side refrigerators as well as single door refrigerators. Various operating components of refrigerators, such as the refrigeration system for example, are not involved with the present invention and have been omitted for the sake of simplicity. Typically shelves, such as that illustrated at 15, are provided in the freezer 12 to provide additional support for items stored in the freezer.

Figure 2:
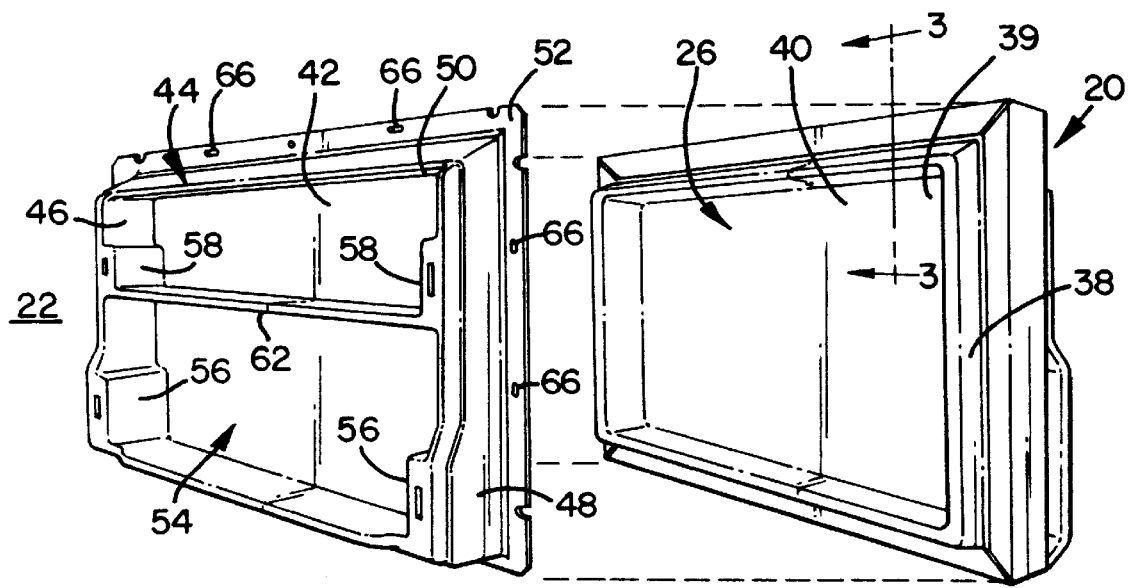
FIG. 2 is an exploded perspective view of the freezer door assembly of FIG. 1, with some parts omitted for purposes of illustration.
Figure 3:
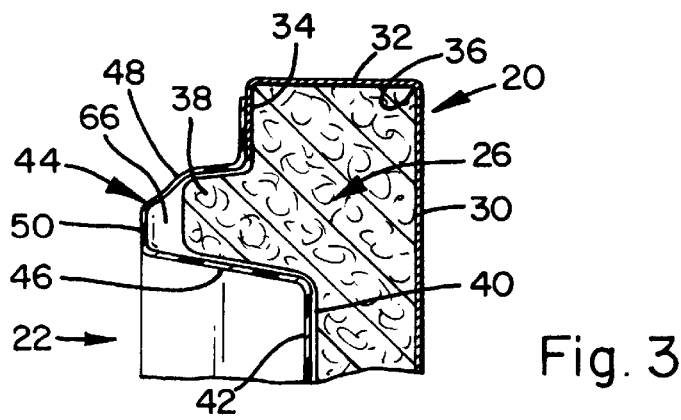
FIG. 3 is a fragmentary cross-section view as seen along line 3—3 in FIG. 2, but with the freezer door in its assembled configuration.

Viewing FIGS. 1–3 the freezer door assembly 13 includes an outer door member 20, an inner door member 22, a gasket 24 and a body 26 of foamed-in-place insulation. The outer door member 20 has a generally rectangular front panel 30 surrounded by a peripheral rim 32 that extends along the lateral edges of the panel 30 so as to entirely surround the perimeter of panel 30. The rim 32 projects generally perpendicular to panel 30 in a rearward direction. That is the rim projects toward the cabinet 11 when the door assembly 13 is mounted in its normal closed position on the cabinet 11. A flange 34 extends along the distal edge of rim 32 and projects perpendicularly inward to overlie the front panel 30. The outer door member 20 defines a cavity 36 that is substantially filled with the body 26 of foamed-in-place insulation, as will be described in more detail hereafter.

Conveniently the outer door member is formed by bending a sheet of suitable material, such as pre-painted steel, into the shape shown. Once the outer member 20 is formed it is placed into a suitable fixture and an insulation resin system, such as a polyurethane system, is injected into the cavity. The urethane system expands or foams-in-place to substantially fill the cavity 36. The configuration of the foam, where not confined by outer door member 20, is determined by the configuration of the fixture. In accordance with one aspect of the present invention the fixture is contoured so that the insulation body 26 includes a rib 38 which extends around the outer door 20 just inside the distal edge of the flange 34. The rib projects rearward, that is toward the cabinet 11. The surface 39 of the foam body 26, including the rib 38, not covered by the outer door member 20 is cured during the foaming operation. Thus the surface 39 is in the form of a stable skin.

As will be explained in detail hereafter, the rib has a predetermined external cross-section configuration to fit fairly closely within a hollow recess in the inner door member 22. The cured skin 39 enables the inner door member 22 easily to be mounted over and removed from the insulation body 26. The insulation body has a bottom surface 40 which is generally rectangular and generally parallel to front panel 30. In the illustrative embodiment the surface 40 is recessed into the cavity 36 so that part of the inner door member 22 can be received in the cavity. In other door configurations, sometimes called flat doors, the surface 40 is substantially even with the flange 34.

The inner door member 22 has a generally rectangular base panel 42 surrounded by a peripheral wall structure 44 which extends along the entire perimeter of panel 42 and projects rearward of the panel, that is toward the cabinet 11. The wall structure 44 includes an inner wall 46 that projects rearward from the lateral edges of panel 42. The rear or distal edge of wall 46, remote from panel 42, is joined to an outer wall 48 by means of a rear wall 50. From rear wall 50 the outer wall 48 projects forward, that is away from the cabinet 11, in spaced apart relationship with inner wall 46. The walls 46–50 define the hollow interior of the wall structure 44 with a predetermined cross-section configuration. As previously mentioned, in accordance with one aspect of the present invention, the insulation rib 38 is provided with an external cross-section configuration that corresponds to and is slightly smaller than the internal cross-section configuration of the hollow wall structure 44. Thus the rib 38 easily will fit within the hollow wall structure 44, while adding significant strength to the structure 44 and significantly reducing the heat transfer through wall structure 44 when the door is closed.

A flange 52 projects outward along the distal edge of outer wall 48. When the inner door member is mounted on the outer door, the flange abuts or overlies the flange 34 of outer door member 20. In the illustrative embodiment, the wall 46 is wider than the wall 48 and base panel 42 is slightly smaller than the inside dimension of the flange 34 so that the base panel 42 is received within the cavity 36 and rests against the bottom surface 40 of insulation. Thus, as seen in FIG. 3, the body of insulation 26 substantially fills the space between the outer door member 20 and inner door member 22 and the rib 38 fits within the hollow interior of the wall structure 44. It will be understood that, in flat doors the walls 46 and 48 have essentially the same width so that the base panel 42 will rest against the bottom surface 40.

In the illustrative embodiment, the base panel 42 and inner wall 46 form a recess 54 in which items can be stored. To that end the wall structure 44 includes integral bosses 56 and 58. The bosses 56 are spaced slightly above the bottom of recess 54 and mount a rail 60 (see FIG. 1) that retains items supported on the bottom of wall structure 44. An integral hollow shelf 62 extends across the base panel 42 at a convenient height, such as about its vertical mid-point. The bosses 58 are slightly above the shelf 62 and mount a rail 64 (see FIG. 1) that retains items supported on the shelf 62.

Conveniently the bosses 56–58 are formed integrally with the wall structure 44 and the insulation rib 38 is formed to substantially fill the bosses when the inner door member 22 is mounted on the outer door member 20. Also, if desired the body of insulation 26 can be formed with a additional rib (not shown) which corresponds to hollow shelf 62 and fills it when the door is assembled. As seen in FIG. 3, the rib 38 does not extend to the bottom or inner end of the hollow wall structure 44 so that a small space 66 is provided between rib 38 and end wall 50 of wall structure 44. This assures that, when the inner and outer doors are attached, the hollow wall structure 44 will not bind on the rib 38. Also the space 66 provides room for the rails 60,64 to be attached to the inner door member 22 without damage to the foam body 26.

Conveniently the inner door member is molded of a suitable plastic material. After it is formed, the inner member 22 is mounted on the outer member 20 by screws or similar fasteners. Conveniently, as is well known in the art, C-shaped gasket mounting strips (not shown) are laid over the flange 52 adjacent all four edges of the door and screws are driven through the strips, through holes 66 in the flange 52 and seated in the steel flange 34. The gasket 24 then is mounted in the strips.

While a specific embodiment of the invention has been illustrated and described herein, it is realized that modifications and changes will occur to those skilled in the art to which the invention pertains. It is therefore to be understood that the appended claims are intended to cover all such modifications and changes as fall within the true spirit and scope of the invention.

What is claimed is:

1. A method of manufacturing a refrigerator door assembly, said method comprising the steps of:

forming an outer door member with a generally rectangular front panel surrounded by a peripheral rim projecting rearward of the panel around its perimeter to form a cavity;

forming an inner door member with a generally rectangular base panel surrounded by a hollow wall structure projecting rearward of the base panel around its perimeter;

foaming-in-place, solely in the outer door member cavity and independently of said inner door member, a body of insulation including a rib of predetermined cross-section protecting rearward of and extending along the outer door member rim; and mounting the inner door member on the outer door member with the rib of insulation substantially filling the hollow wall structure.

2. A method of manufacturing a refrigerator door assembly as set forth in claim 1, further including the step of providing the rib of insulation with a stable skin juxtaposed to the inner door member.

\* \* \* \* \*